United States Patent [19]

Petersen

[11] Patent Number: 4,743,717

[45] Date of Patent: May 10, 1988

[54] APPARATUS FOR STOPPING ELECTRICALLY DRIVEN WATERING SYSTEM

[76] Inventor: Loyal F. Petersen, P.O. Box 207, Osmond, Nebr. 68765

[21] Appl. No.: 103,682

[22] Filed: Oct. 2, 1987

[51] Int. Cl.⁴ ............................................. H01H 35/18
[52] U.S. Cl. ..................................... 200/84 C; 73/313; 307/115; 361/178; 340/624
[58] Field of Search .................. 200/84 R, 84 C, 61.2, 200/302.1; 307/118; 335/205, 206, 207; 340/623, 624, 625; 73/307, 308, 313, 319; 361/178, 189, 192

[56] References Cited

U.S. PATENT DOCUMENTS

| | | | |
|---|---|---|---|
| 4,020,481 | 4/1977 | Nakagawa | 340/624 |
| 4,244,364 | 1/1981 | Groshkin | 340/624 |
| 4,499,348 | 2/1985 | Gismervik | 200/84 C |
| 4,647,740 | 3/1987 | Hansen, III | 340/624 |

Primary Examiner—G. P. Tolin
Attorney, Agent, or Firm—E. Robert Newman

[57] ABSTRACT

An apparatus for stopping an electrically driven watering system in response to rainfall, said apparatus having a float activating a reed switch which is mounted within a rain-catching cylinder, said read switch then activating a relay switch to interrupt the flow of electricity in the system. Also included is a rigid mounting strap and pivot strap permitting the casing of the apparatus to be conveniently removed and the rain-catching system to be emptied by one standing on the ground.

8 Claims, 1 Drawing Sheet

U.S. Patent    May 10, 1988    4,743,717
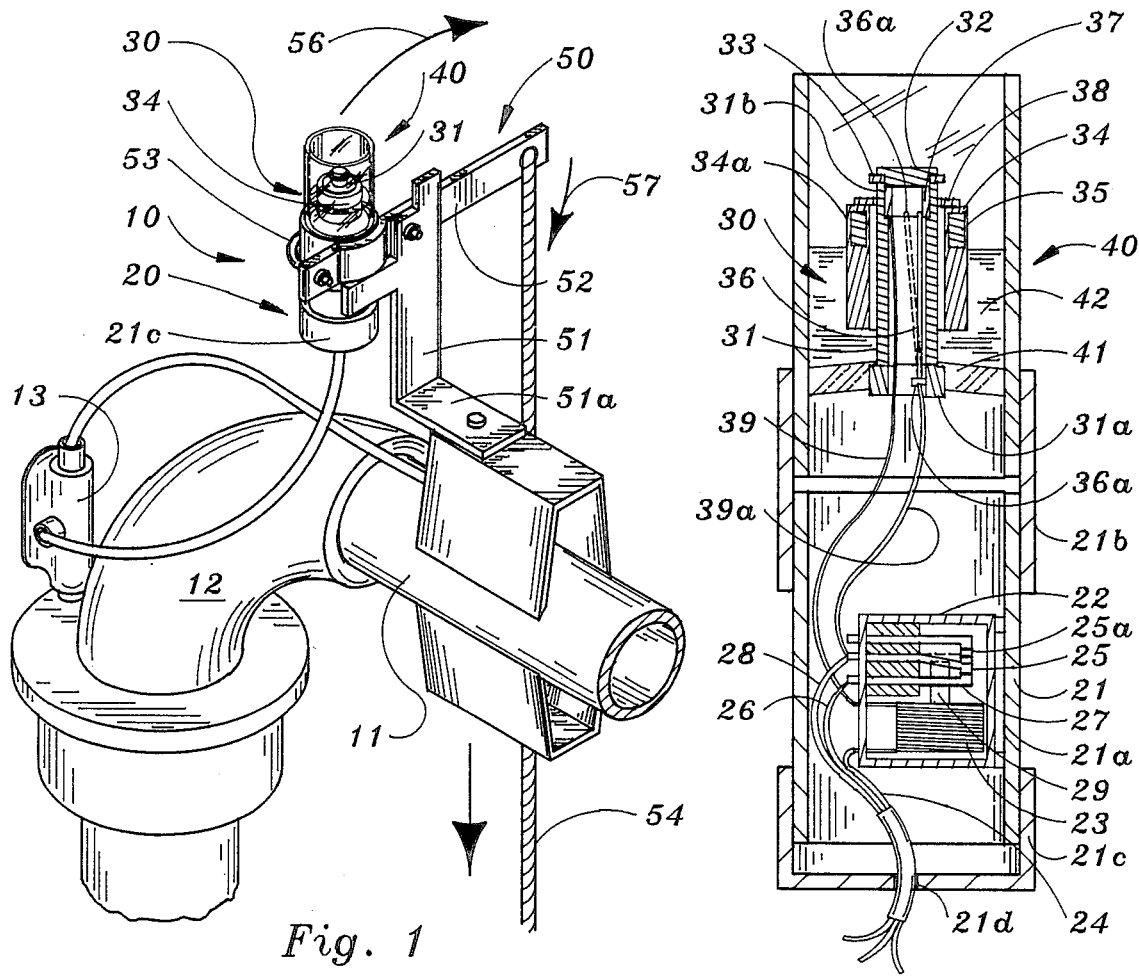
Fig. 1
Fig. 2
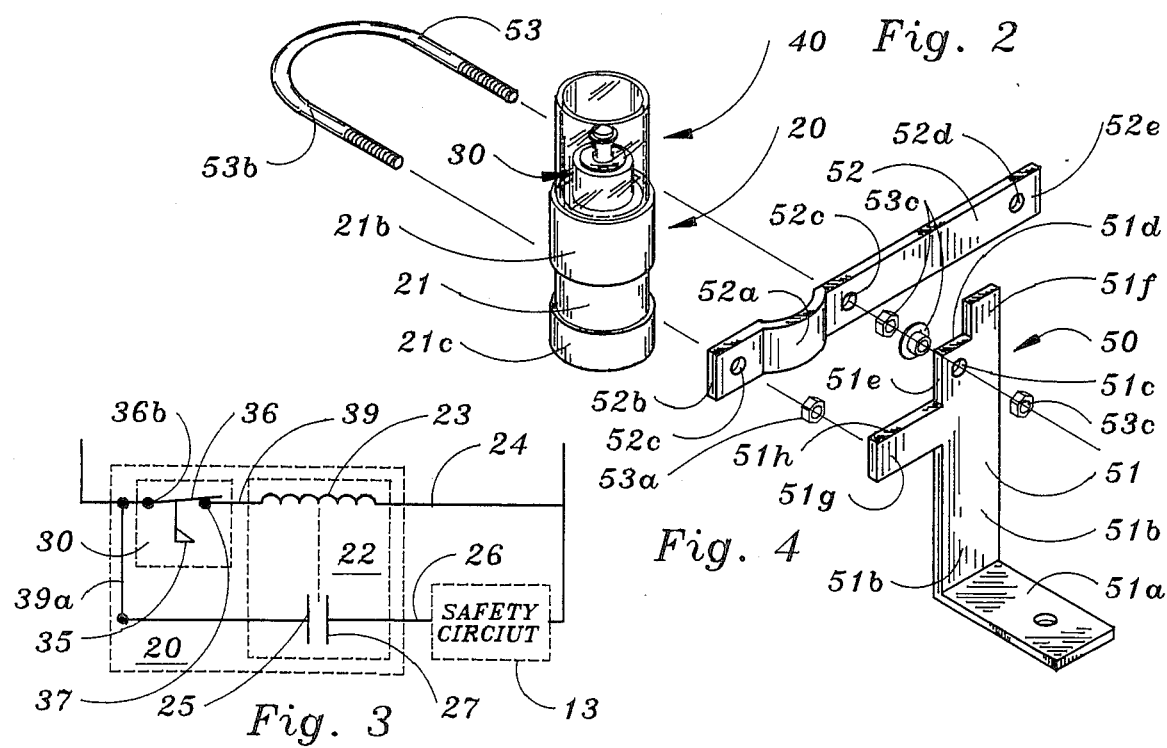
Fig. 3
Fig. 4

APPARATUS FOR STOPPING ELECTRICALLY DRIVEN WATERING SYSTEM

TECHNICAL FIELD

The present invention relates generally to shut-off devices which function when the extent of an external, or environmental condition, reaches a predetermined level. More particularly, it relates to an apparatus for stopping an electrically driven watering system when a predetermined amount of rain has fallen.

BACKGROUND ART

Ordinarily center pivot irrigation systems continue to operate even during a severe rainstorm. The result is a waste of energy, water, and excess erosion. To avoid such waste it is necessary that one travel to the site of the system when heavy rainfall is occurring. Not only is such travel costly, its need generally occurs at inopportune times. Since such systems are typically located one to ten miles distant, there is an inherent time-lag, with ensuing extra costs.

Shut off controls responsive to telephone or radio signals have been used to obviate such travel. However, such control systems are expensive, often costing in the thousands of dollars. Also, it is not unusual for rainfall quantities to vary widely, as much as one to two inches within a range of one to five miles. The result is that such remote controls are used when they should not be or not used when they should be.

DISCLOSURE OF THE INVENTION

It is an object of the present invention to provide an improved apparatus for stopping an electrically driven watering system when a predetermined amount of rain has fallen.

Another object is to provide an apparatus which will save energy and water and avoid excess erosion when electrically driven watering systems are operating during periods of heavy rainfall.

A further object of the present invention is a provision of an apparatus for stopping an electrically driven watering system when a predetermined amount of rain has fallen in the immediate vicinity of the system.

More specifically, it is an object of the present invention to provide an open cylinder for catching rainfall, within which cylinder is a collar-shaped float containing a magnet, said float being mounted around a stem containing a reed of ferrous-magnetic material. Said reed is positioned to open an electrical circuit when the float has risen a predetermined amount, the effect of which is to permit a normally opened relay switch which is wired to the safety circuit of the electrically driven center pivot watering system to open. A casing to which said cylinder is mounted and within which said relay switch is located is mounted on a pivoting support which will normally maintain the rain-catching cylinder in a vertical orientation but which has means for causing it to pivot past the horizontal in order to permit collected rain water to spill out. To permit easy cleaning and repair of the various elements affixed to and within the casing, it is removably attached to the pivoting support.

BRIEF DESCRIPTION OF THE DRAWINGS

FIG. 1 is a partial isometric view of a center pivot irrigating system, in particular the pivot point thereof, which shows the apparatus of the present invention mounted thereon;

FIG. 2 is a super-enlarged sectional view of the casing, rain-catching, and reed switch elements of the present invention;

FIG. 3 is a wiring diagram of the apparatus of the present invention; and

FIG. 4 is an enlarged exploded partial isometric view of the device of the present invention.

BEST MODE FOR CARRYING OUT THE INVENTION

Referring now to the drawings, in which identical or corresponding parts are indicated by the same character throughout the several views and more particularly to FIG. 1, whereon the apparatus of the present invention is designated generally at 10, said apparatus 10 is comprised of a relay casing assembly designated generally at 20, a reed switch assembly designated generally at 30, a rain-catching cylinder designated generally at 40, and a support assembly designated generally at 50. Apparatus 10 may be mounted at any fixed location within the vicinity of pivot system 11. In FIG. 1 it is shown mounted atop pivot point 12 of pivot system 11 where it is near safety circuit 13 and where no natural obstructions will interfere with its rain collecting function.

Referring to FIG. 2, relay casing assembly 20 may be comprised of a single cylinder tube enclosed at the bottom, or for ease of assembly it may be several cylindrical sections such as is shown in the preferred embodiment. Casing assembly 20 includes a cylindrical center section 21 in which is mounted on inner wall 21a thereof a normally open relay switch 22 (shown in FIG. 2 somewhat diagrammatically).

Referring also to FIG. 3, relay switch 22 is wired in series with safety circuit 13 and in parallel with reed switch 30. Reed switch 30 is mounted to annular ring 41 (in a manner which will be more fully described later) of cylinder 40.

Referring now only to FIG. 2, hollow stem 31 of reed switch 30 has a cap 32 which has a removable retainer ring 33 mounted just below its top. Retainer ring 33 extends away from the vertical sides of stem 31 far enough to retain cyclindrical collar 34 around stem 31. Within collar 34, near its upper end 34a is a donut-shaped magnet 35. Except for magnet 35 collar 34 is comprised of a non-ferrous, non-corrosive material in which magnet 35 is ensconced. This material has a specific gravity sufficiently less than that of rainwater that, in combination with magnet 35, collar 34 will float in rainwater whenever it happens to accumulate in cylinder 40.

Affixed to the lower end 31a and inside of hollow stem 31 is flexible reed 36 of ferrous-magnetic material. Flexible reed 36 extends into the upper portion of stem 31 where it will touch contact 37, which is mounted within the upper end 31b and inside of hollow stem 31. Reed 36, being flexible, may be pulled towards the center of stem 31 to break contact with contact 37. If the pulling force is interrupted, reed 36 will snap back in contact with contact 37. During periods of heavy rainfall, as rainwater 42 accumulates, collar 34 will move upwardly on stem 31 of reed switch 30. As soon as a preselected quantity of rain has fallen, such as three-fourths of an inch, reed 36 will react to the magnetic forces of re-positioned magnet 35 and thereby be pulled away from contact 37. Any flow of electricity which may be moving through contact 37 and reed 36 will be interrupted. This position of flexible reed 36 is shown in broken lines 36a. The amount of rainfall necessary to activate reed 36 can be reduced by installing one or more washers 38 of an appropriate size atop collar 34 by the removal and reinstallation of retainer ring 33. This result is possible because there is a shorter period of time over which a force must act on reed 36 as said force is applied higher along its length.

Conductor 39 connects contact 37 with one lead of coil 23 of relay 22. The other lead of coil 23 is run to power through conductor 24. The lower end 36b of reed 36 affixed to the lower end 31a of stem 31 is connected through conductor 39a to normally open flexible contact 25 (open position shown in broken lines in FIG. 2) of relay 22. Conductor 26 connects contact 27 of relay 22 to power and conductor 28 leads to ground (not shown in FIG. 3). Thus, a sufficient quantity of rainfall will open reed switch 30, interrupting the current flowing through coil 23. Flexible contact 25 will no longer be held against contact 27 by the magnetic field of coil 23 and relay 22 will return to its normally open orientation. The interruption of current through safety circuit 13 will cause the irrigation system to stop.

Casing assembly 20 further includes connector ring 21b and base portion 21c. Connector ring 21b effectively connects cylinder 40 to the top of center section 21. Connector ring 21b and base portion 21c substantially protect the interior of casing 20 from the environment while providing an opening 21d for conductors 24, 26, and 28 in a location least likely to permit foreign matter to enter casing 20.

Cylinder wall 42 of rain-catching cylinder 40 is of transparent material in order that a person on the ground, below pivot point 12 can see when an accumulation of rainwater is preventing operation of pivot system 11. Through the use of epoxy or other well-known sealants at the joining of the interior of transparent cylinder wall 42 with the outer edge of annular ring 41 and the exterior of lower end 31a of stem 31 with inner edge of annular ring 41, rainwater within rain-catching cylinder 40 cannot reach the interior of stem 31 or casing 20.

Casing 20, reed switch 30, and cylinder 40 are mounted to pivot system 11 by support 50. Referring now to FIG. 4, support 50 is comprised of rigid L-shaped mounting strap 51 and rigid pivot strap 52. The horizontal leg 51a of strap 51 is affixed by bolt or other well-known means to a horizontal portion on pivot system 11. The vertical leg 51b of strap 51 has a circular opening 51c, the center of which is at the quarter point across the top of vertical leg 51b. Opening 51c is the same distance from upper edge 51d of leg 51b as it is from the proximal vertical edge 51e thereof. Projection 51f is coplanar with and affixed atop the half portion of upper edge 51d in which opening 51c is not centered. Extension 51g is coplanar with and affixed to proximal edge 51e of leg 51b. Upper edge 51h of extension 51g is a distance below upper edge 51d of leg 51b which is approximately equal to the width of pivot strap 52.

Pivot strap 52 is straight with the exception of arcuate portion 52a proximal end 52b. Arcuate portion 52a has a curvature such that a portion of connector ring 21b will fit comfortably against it and thus be maintained at a right angle to strap 52. Two circular openings 52c in strap 52 surround arcuate portion 52a and are spaced apart a distance that will permit double threaded U-bolt 53 to be positioned so as to surround most of connector ring 21b and hold it snugly within arcuate portion 52a.

Nut 53a holds the one leg 53b of U-bolt 53 to pivot strap 52 through opening 52c proximal end 52b. Nut, washer, bushing, and outer nut assembly 53c holds the other leg 53b of U-bolt 53 to pivot 52 through the other opening 52c, distal end 52b, in a well-known manner, such that pivot strap 52 will be able to pivot about opening 51c of strap 51. For purposes of maintenance and repair, casing 20 and its affixed elements may be simply removed from and reinstalled on strap 52 by unscrewing nuts 53a and 53c from U-bolt 53.

Pull cord 54 is connected to opening 52d located proximal end 52e, which is opposite end 52b, of pivot 52. The weight of casing 20 and the elements of apparatus 10 affixed thereto will ordinarily hold casing 20 upright, since arcuate portion 52a of pivot 52 is prevented from moving past the horizontal by extension 51g. This situation will not change if cylinder 40 fills up with rainwater. After any rainfall which is suspected to have caused an interruption in current to safety switch 13, one may travel, at a convenient time, to the location of pivot system 11 to see how much rainwater has collected in rain-catching cylinder 40. Upon observing that cylinder 40 contains sufficient rainwater to shut system 11 off, pull cord 54, which extends to a convenient distance from the ground, may be pulled downwardly (see arrows 56 and 57) until rainwater is emptied from cylinder 40. Collar 34 will drop to the bottom of cylinder 40, reed 31 will snap back to contact 37 and irrigation may commence again either at manual or timed signal. Projection 51f will prevent arcuate portion 52a from crossing beyond the top center of leg 51b of strap 51, thus avoiding a situation where the weight of casing 20 and its affixed elements may hang upside down on the other side of leg 51b and require someone to climb to the top of the pivot.

It will be readily understood that the particular disposition or arrangement or nature of the elements of the invention are not of the essence of the invention, and that many variations, substitutions, and modifications may be made, in departure from their particular construction and characterization in the drawings and foregoing description, without departing from the true spirit of the invention. It is therefore to be understood that the invention should be limited only by the breadth and scope of the appended claims.

What is claimed is:

1. An apparatus for stopping an electrically driven watering system when a predetermined amount of rain has fallen, comprising:
   a cylindrical casing mounted at a fixed point in the vicinity of said watering system, said casing being open at its upper end and having a bottom;
   a cylinder for catching rain having a bottom with a concentric circular opening therein, said cylinder being concentrically affixed to the upper end of said casing;
   a vertically oriented hollow stem hermetically affixed to the bottom of said rain-catching cylinder within the opening therein so as to extend upwardly therefrom and to permit communication with the interior of said casing;
   a cap hermetically affixed atop said stem, said cap having a horizontal retainer ring;
   an electrode affixed within said stem at its upper end, said electrode having a first conductor affixed thereto;
   a reed of ferrous-magnetic material supported from the lower interior of said stem and extending at its upper end adjacent said electrode so as to contact it unless pulled away therefrom, said reed having a second conductor affixed to its lower end;

a ring-shaped permanent magnet affixed within a collar, the combined specific gravity of said magnet and collar being less than that of rainwater, said collar being mounted around said stem below said retainer ring and having an interior diameter greater than that of the exterior diameter of said stem, yet not so great so as not to be restrained thereon by said retainer ring;

a normally open relay switch mounted within said casing, one lead of the coil of said switch being connected to said first conductor and the other lead of said coil being connected to said second conductor, said relay switch being connected in series to the power supply of said watering system; and a power source for supplying electric current to said first and second conductors and to the contacts of said relay switch, and means for connecting said power source to said conductors and contacts.

2. The apparatus for stopping an electrically driven watering system when a predetermined amount of rain has fallen as defined in claim 1, wherein said casing is further characterized as being removably mounted.

3. The apparatus for stopping an electrically driven watering system when a predetermined amount of rain has fallen as defined in claim 1, wherein said rain catching cylinder is made of transparent materials.

4. The apparatus for stopping an electrically driven watering system when a predetermined amount of rain has fallen as defined in claim 2, wherein said rain catching cylinder is made of transparent materials.

5. The apparatus for stopping an electrically driven watering system when a predetermined amount of rain has fallen as defined in claim 1, further comprising:

a vertical planar strap mounted near its lower end to said fixed point, said vertical strap having a coplanar horizontal ledge extending to one side;

a normally horizontal planar strap pivotally mounted intermediate its end to said vertical strap at a point near the upper end of said vertical strap, the lower edge of said horizontal strap being aligned with the upper edge of said ledge when said normally horizontal strap is horizontally oriented, said horizontal strap having a projecting means even with its lower edge for restraining it from pivoting beyond said ledge;

means for removably affixing said casing to said horizontal support on the side thereof opposite said projecting means, whereby the weight of said casing and said elements affixed thereto and contained therein will tend to maintain said horizontal support element in its normally horizontal orientation; and means for pulling the end of said horizontal support member distal said casing downwards past a point directly below the pivotal mounting of said horizontal support member.

6. The apparatus for stopping an electrically driven watering system when a predetermined amount of rain has fallen as defined in claim 2, further comprising:

a vertical planar strap mounted near its lower end to said fixed point, said vertical strap having a coplanar horizontal ledge extending to one side;

a normally horizontal planar strap pivotally mounted intermediate its ends to said vertical strap at a point near the upper end of said vertical strap, the lower edge of said horizontal strap being aligned with the upper edge of said ledge when said normally horizontal strap is horizontally oriented, said horizontal strap having a projecting means even with its lower edge for restraining it from pivoting beyond said ledge;

means for removably affixing said casing to said horizontal support on the side thereof opposite said projecting means, whereby the weight of said casing and said elements affixed thereto and contained therein will tend to maintain said horizontal support element in its normally horizontal orientation; and means for pulling the end of said horizontal support member distal said casing downwards past a point directly below the pivotal mounting of said horizontal support member.

7. The apparatus for stopping an electrically driven watering system when a predetermined amount of rain has fallen as defined in claim 3, further comprising:

a vertical planar support mounted near its lower end to said fixed point, said vertical support having a coplanar horizontal ledge projecting to one side;

a normally horizontal planar support pivotally mounted intermediate its end to said vertical support at a point near its upper end at which its lower edge is aligned with the upper edge of said ledge when said normally horizontal support is horizontally oriented, said horizontal support having a projecting means even with its lower edge for restraining it from pivoting beyond said ledge;

means for removably affixing said casing to said horizontal support on the side thereof opposite said projecting means, whereby the weight of said casing and said elements affixed thereto and contained therein will tend to maintain said horizontal support element in its normally horizontal orientation; and means for pulling the end of said horizontal support member distal said casing downwards past a point directly below the pivotal mounting of said horizontal support member.

8. The apparatus for stopping an electrically driven watering system when a predetermined amount of rain has fallen as defined in claim 4, further comprising:

a vertical planar support mounted near its lower end to said fixed point, said vertical support having a coplanar horizontal ledge projecting to one side;

a normally horizontal planar support pivotally mounted intermediate its ends to said vertical support at a point near the upper end of said vertical strap, the lower edge of said horizontal strap being aligned with the upper edge of said ledge when said normally horizontal support is horizontally oriented, said horizontal support having a projecting means even with its lower edge for restraining it from pivoting beyond said ledge;

means for removably affixing said casing to said horizontal support on the side thereof opposite said projecting means, whereby the weight of said casing and said elements affixed thereto and contained therein will tend to maintain said horizontal support element in its normally horizontal orientation; and means for pulling the end of said horizontal support member distal said casing downward past a point directly below the pivotal mounting of said horizontal support member.

* * * * *